(12) United States Patent
Nicastri

(10) Patent No.: US 6,431,635 B2
(45) Date of Patent: Aug. 13, 2002

(54) FLEXIBLE HOOD FOR A CONVERTIBLE MOTOR CAR

(75) Inventor: Antonio Nicastri, Turin (IT)

(73) Assignee: Industrie Pininfarina S.p.A., Turin (IT)

(*) Notice: Subject to any disclaimer, the term of this patent is extended or adjusted under 35 U.S.C. 154(b) by 0 days.

(21) Appl. No.: 09/916,328

(22) Filed: Jul. 30, 2001

(30) Foreign Application Priority Data

Jul. 31, 2000  (EP) ............................................ 00830544

(51) Int. Cl.$^7$ ................................................ B60P 7/02
(52) U.S. Cl. .............. 296/107.09; 296/116; 296/107.15
(58) Field of Search .......... 296/109.09, 100.11–100.18, 296/219, 122, 107.01, 116

(56) References Cited

U.S. PATENT DOCUMENTS

| | | | | |
|---|---|---|---|---|
| 1,826,399 A | * | 10/1931 | Humer ................... | 296/107.09 |
| 5,004,291 A | * | 4/1991 | Bauer et al. ................ | 296/116 |
| 5,207,474 A | * | 5/1993 | Licher et al. .......... | 296/107.15 |
| 5,620,226 A | * | 4/1997 | Sautter, Jr. ............. | 296/107.09 |
| 5,673,959 A | | 10/1997 | Padlo | |
| 5,903,119 A | * | 5/1999 | Laurain et al. ........ | 296/107.09 |
| 5,971,470 A | * | 10/1999 | May et al. ............. | 296/107.09 |
| 6,039,382 A | * | 3/2000 | Mather et al. ......... | 296/107.01 |
| 6,053,559 A | * | 4/2000 | Haberl et al. .......... | 296/107.09 |
| 6,139,087 A | * | 10/2000 | Wolfmaier et al. .... | 296/107.16 |
| 6,270,143 B1 | * | 8/2001 | Heselhaus et al. ..... | 296/107.09 |
| 6,305,734 B1 | * | 10/2001 | Pecho et al. ........... | 296/107.09 |
| 6,336,673 B1 | * | 1/2002 | Rothe et al. ........... | 296/107.17 |
| 6,343,829 B2 | * | 2/2002 | Busch ................... | 296/107.15 |

FOREIGN PATENT DOCUMENTS

| | | | |
|---|---|---|---|
| DE | 33 39 057 A1 | | 5/1985 |
| DE | 33 39 057 | * | 5/1985 |
| DE | 197 06 417 C1 | * | 7/1998 |
| FR | 2 584 029 | * | 1/1987 |
| JP | 61 218425 | * | 9/1986 |
| JP | 6 156086 | * | 6/1994 |

* cited by examiner

Primary Examiner—Stephen T. Gordon
Assistant Examiner—Kiran B. Patel
(74) Attorney, Agent, or Firm—Sughrue Mion, PLLC

(57) ABSTRACT

A flexible hood for a convertible car which includes a cover with a front portion and a rear portion and a frame for supporting the cover which includes side portions secured to the car body, extending along the sides of the hood and each including a first and a second parallelogram linkage arranged in series and operable to enable the hood to be moved to an extended configuration covering the driving compartment and to a configuration folded away behind this compartment. Each of the second parallelogram linkages has means enabling it selectively to move independently of its associated first linkage, thus making it possible to fold only the front portion of the flexible hood.

8 Claims, 8 Drawing Sheets

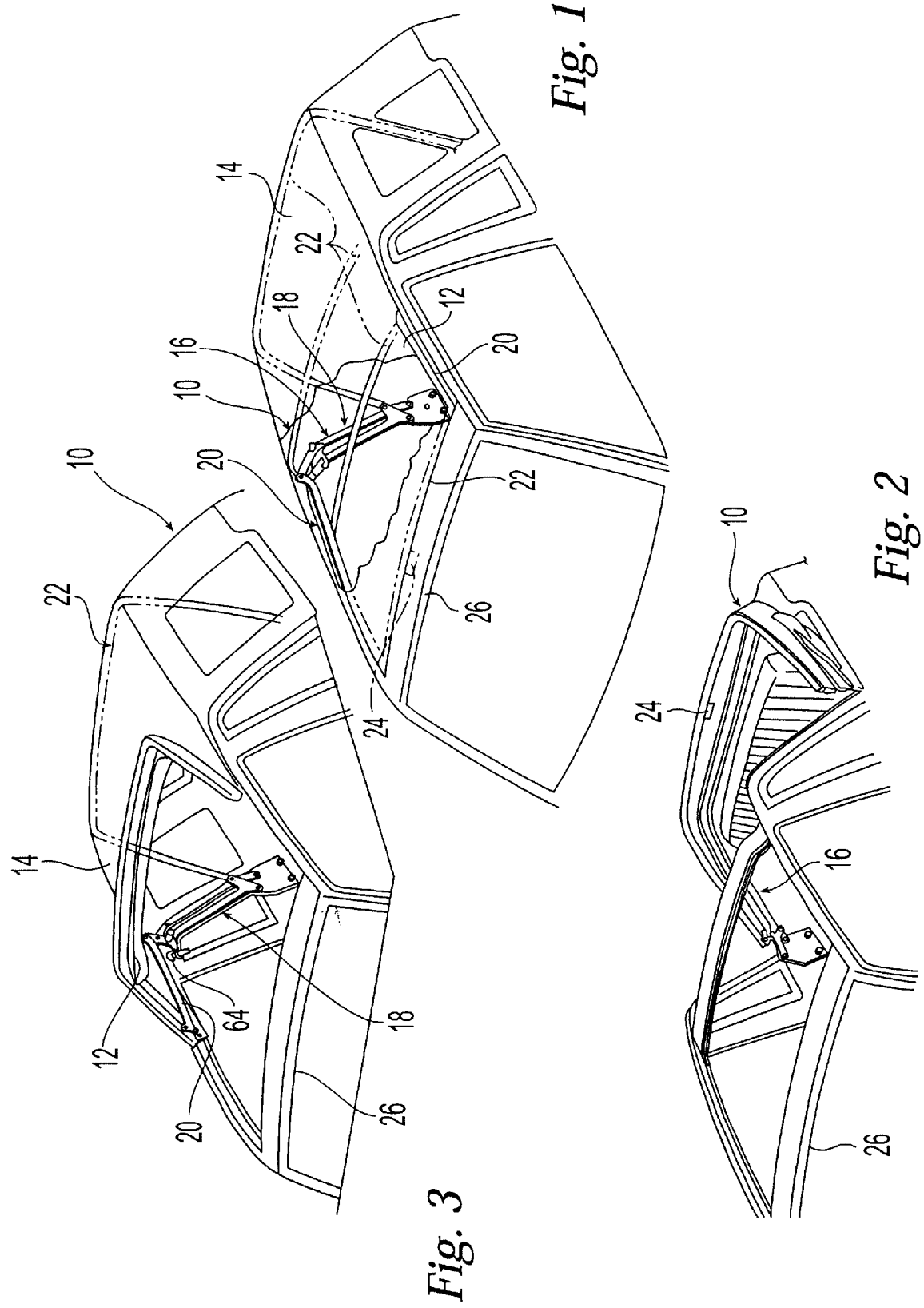

FLEXIBLE HOOD FOR A CONVERTIBLE MOTOR CAR

BACKGROUND OF THE INVENTION

The present invention relates to a flexible hood for a convertible motor car.

In more detail, this hood includes a cover with a front portion and a rear portion, and a support frame with side portions secured to the body of the car, which side portions extend along respective sides of the hood and each include a first and a second parallelogram linkage arranged in series and operable to allow the hood to be extended to cover the passenger compartment and folded behind this compartment.

SUMMARY OF THE INVENTION

The object of the present invention is to improve the versatility and the ways of using a hood of the type described above.

This object is achieved according to the invention by providing a flexible hood having the characteristics described above and characterised in that each of the said second parallelogram linkages has means allowing it selective movement independent of the first linkage with which it is associated, thereby making it possible to fold only the front portion of the flexible hood.

In this way, the flexible hood can be used in an intermediate configuration between the fully extended and the fully folded positions, thus increasing the comfort of the occupants of the car, in particular should they want some ventilation of their compartment without uncovering it completely.

BRIEF DESCRIPTION OF THE DRAWINGS

Further characteristics and advantages of the present invention will become apparent from the detailed description which follows, with reference to the appended drawings, provided purely by way of non-limitative example and in which:

FIG. 1 is a schematic perspective view of a car with a flexible hood according to the invention in a first operating configuration, FIGS. 2 and 3 are schematic perspective views of the car of FIG. 1 with the hood in respective further operating configurations.

DETAILED DESCRIPTION OF THE INVENTION

Figure 4:
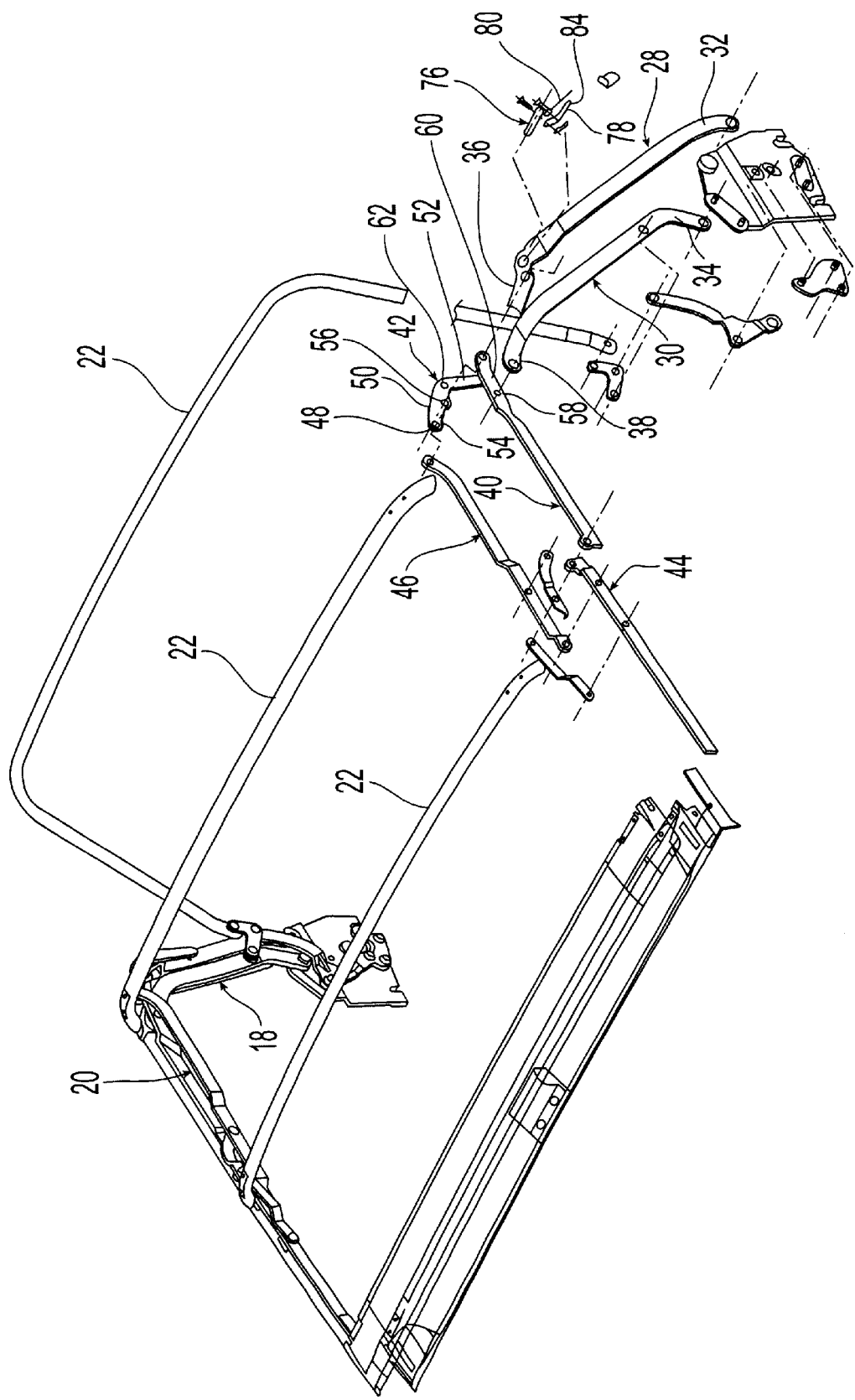
FIG. 4 is an exploded view of components of the hood of the invention.
Figure 5:
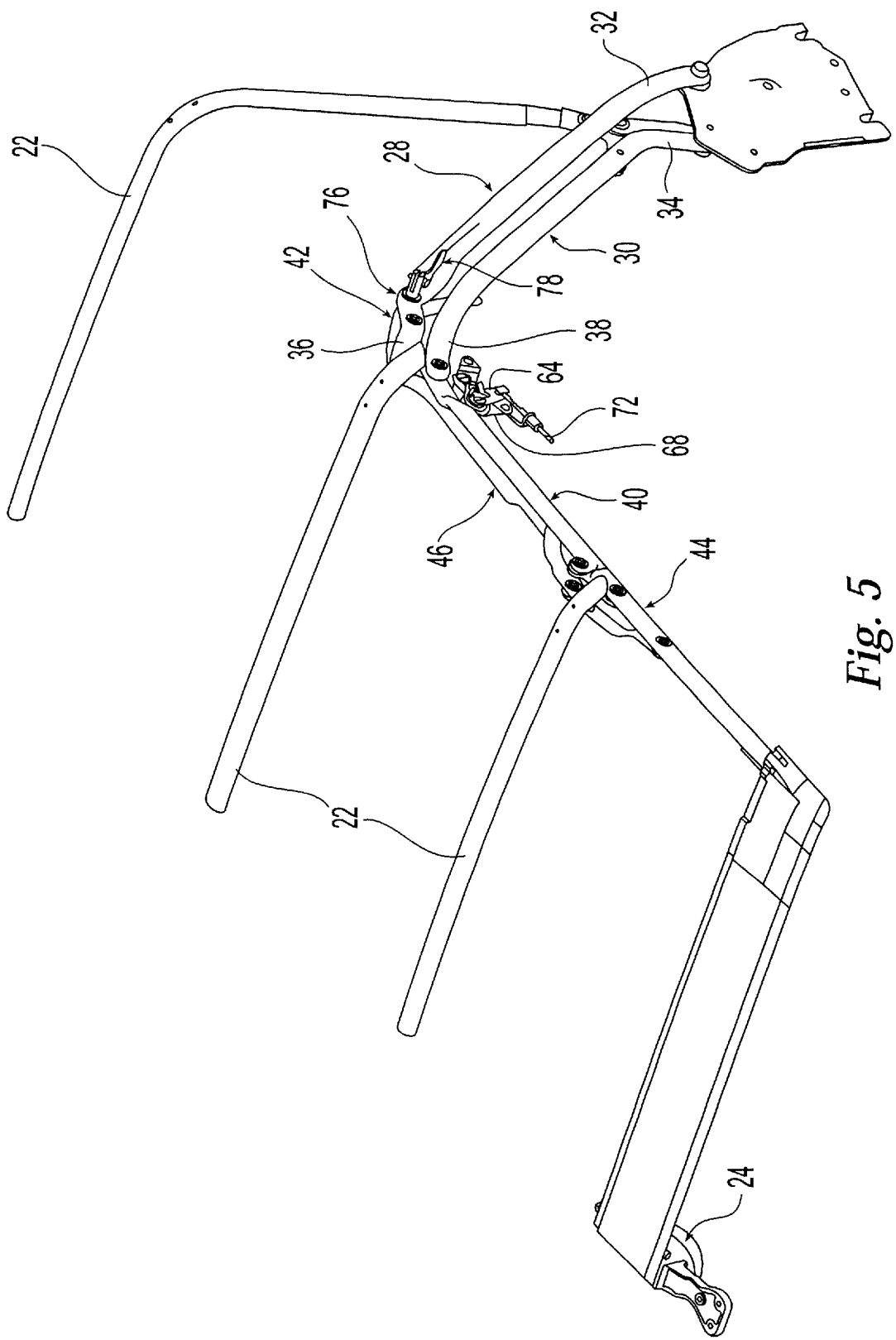
FIG. 5 is a perspective view of the components of FIG. 4 assembled.

A flexible hood for a convertible car includes (FIG. 1) a cover 10 with a front portion 12 and a rear portion 14, and a frame 16 for supporting the cover 10 The frame 16 includes side portions secured to the body of the car, which extend along the respective sides of the hood and each include a first and a second parallelogram linkage 18, 20 arranged in series. The frame 16 also includes, in a manner known per se, a series of central batten elements 22 connecting the parallelogram linkages 18, 20 positioned at the sides. In a known manner, once again, the most forward batten element 22 has a catch mechanism 24 for securing it to the upper portion of the windscreen frame 26, which is not described further, or shown in detail in the drawings, since it is well known in the art. Each of the first parallelogram linkages 18 includes (FIGS. 4 and 5) substantially parallel first and second arms 28, 30, each with a respective end 32, 34 pivotally connected to the body and the other end 36, 38 pivotally connected to a first transverse rod 40.

Each second parallelogram linkage 20, on the other hand, includes the first rod 40, an auxiliary lever 42, a third arm 44 and a second rod 46. One end of the third arm 44 and the lever 42 are pivotally connected to respective ends of the first rod 40, while the ends of the second rod 46 are pivotally connected to the third arm 44 and to one end 48 of the auxiliary lever 42 respectively.

The latter is made up, in particular, of first and second wings 50, 52 arranged at an angle to each other. The pivotal connection 54 to the second rod 46 is along the distal portion of the first wing 50, while the pivotal connection 56 to the first rod 40 is along the median portion of the wing 50, in such a way that this last pivotal connection has a common axis with the connection between the first rod 40 and the first arm 28. In addition, a tooth 60 protrudes laterally from the distal portion 58 of the second wing 52, while a hole 62 passes through the junction area of the two wings 50, 52.

Figure 7:
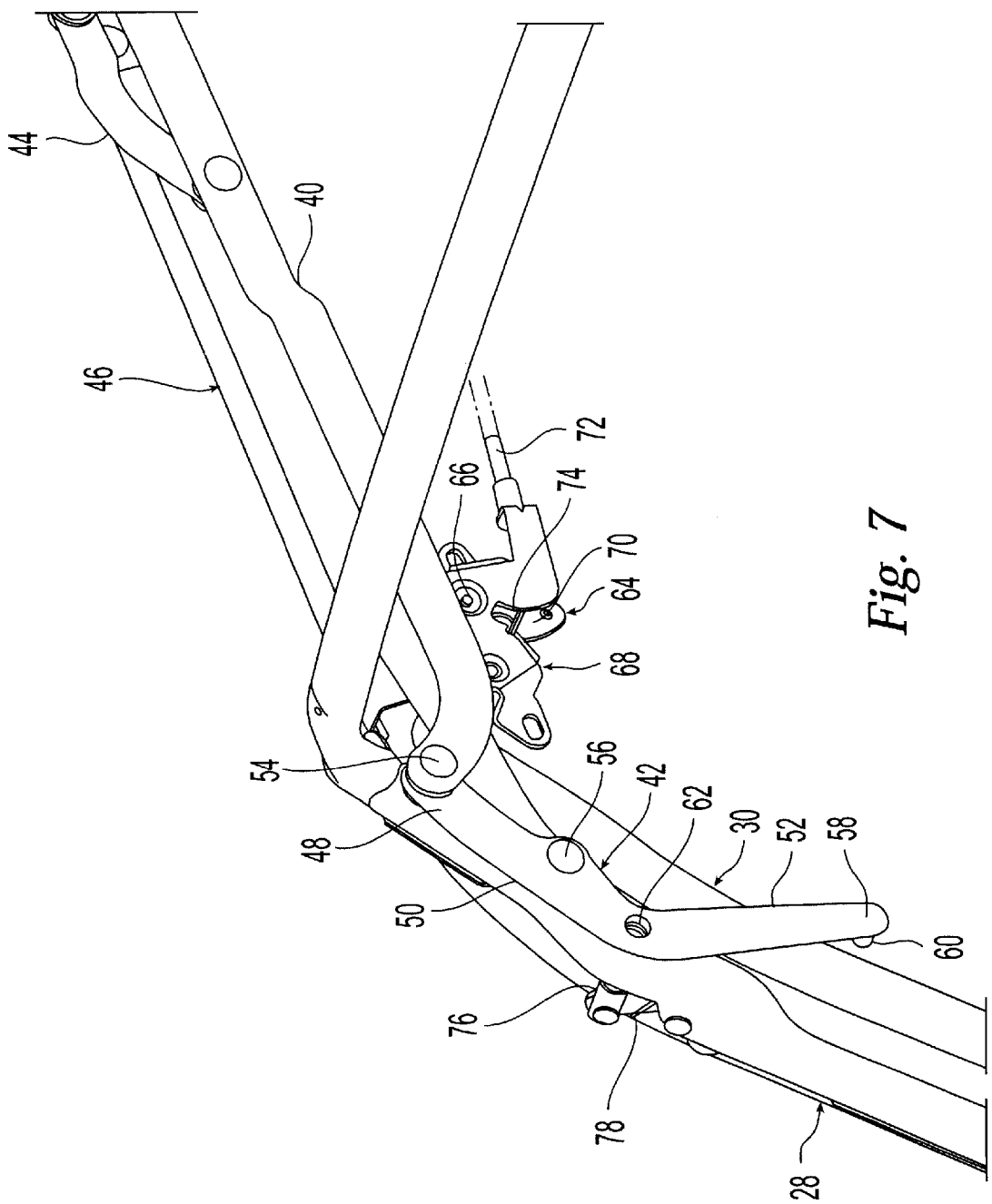

Each tooth 60 is operable to engage—as described in detail later—a respective locking device which includes (FIG. 7) a hook element 64 with one end 66 pivoted on a plate 68 secured to the chassis and the other end 70 shaped like a hook and controlled by an actuator member such as a Bowden cable 72 and a biasing spring 74. Alternatively, in embodiments of the invention which are not shown, the Bowden cable 72 could be replaced by other electrical and/or mechanical and/or hydraulic actuator members.

On each first arm 28 a pin 76 is mounted so it is slidable (see FIGS. 4 and 5) along a direction parallel to the axis of the pivotal connection 56 and able to engage the hole 62 in the auxiliary lever 42. A control lever 78 and a biasing spring 80 are associated with the pin 76 for controlling its sliding movement.

The control lever 78 is formed by first and second wings 82, 84 arranged in a substantially L shape and pivoted on the first arm 28 in the junction area of the two wings 82, 84. The distal end of the first wing 82 is connected to the pin 76, while the distal end of the second wing 84 is connected to an actuator member, such as a Bowden cable 86. Alternatively, in embodiments of the invention which are not illustrated, the Bowden cable 86 could be replaced by different electrical and/or mechanical and/or hydraulic actuator members.

The flexible hood just described can be moved to a fully extended configuration covering the driving compartment (FIG. 1), a fully folded configuration leaving the said compartment totally uncovered (FIG. 2) and an intermediate position (FIG. 3) in which the front portion 12 is folded while the rear portion 14 is extended, leaving the driving compartment partially uncovered.

Figure 6:
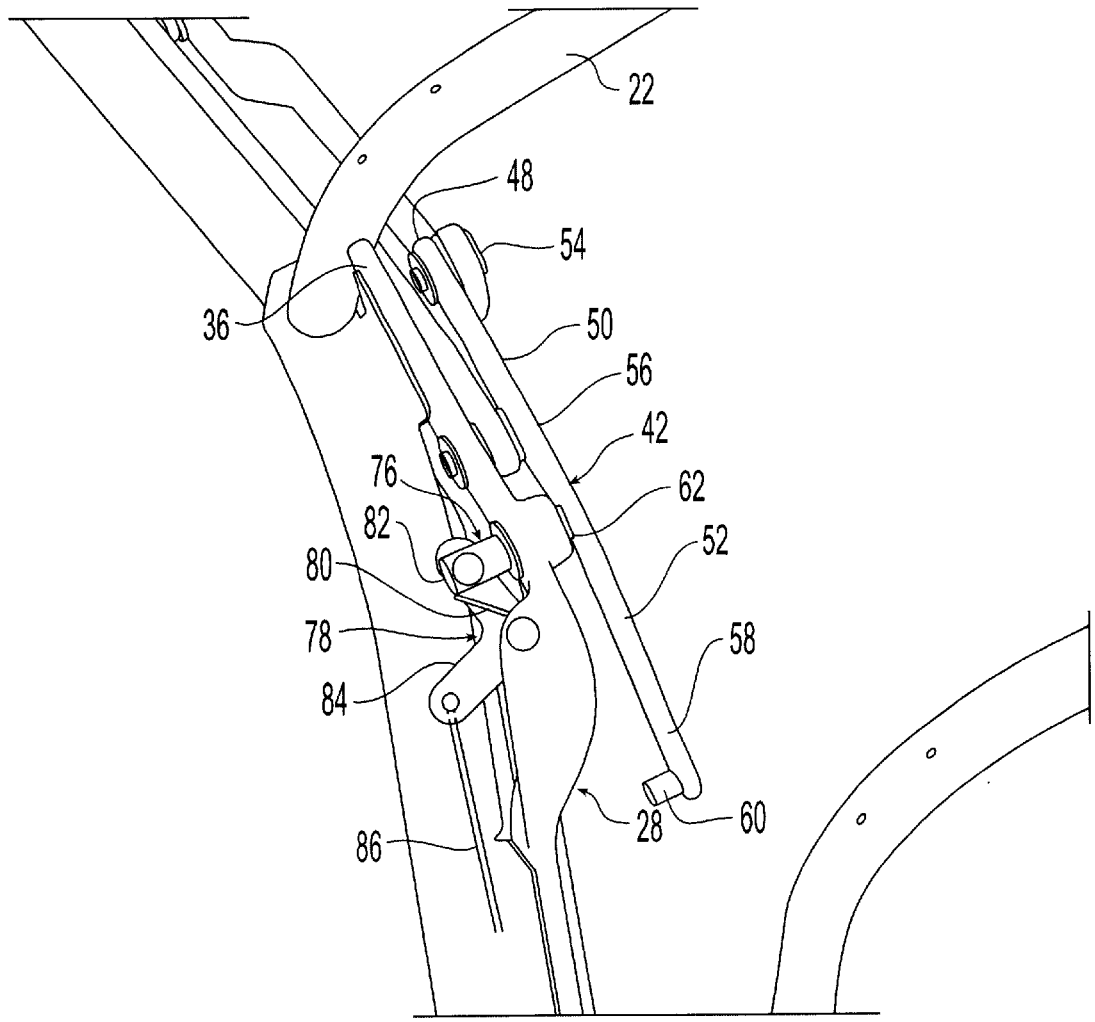
FIGS. 6 and 7 are perspective views of details of the device of the invention in the configuration of FIG. 1.

The hood is normally held in its extended position by the mechanism 24 which enables the fowardmost batten element 22 to be secured to the upper portion of the windscreen frame 26. In this extended position, the pins 76 are engaged in the holes 62 in the levers 42 (FIG. 6).

In order to fold the hood from its extended configuration (FIG. 1) into its fully folded configuration (FIG. 2) a user needs only disengage the mechanism 24 and push back the front portion of the frame 16.

During this movement, the engagement of the pins 76 in the holes 62 ensures that each auxiliary lever 42 remains rigidly secured to a respective first arm 28, whereby both parallelogram linkages 18, 20 move backwards simultaneously, thus fully folding the hood.

It is clear that the latter could be fitted with automatic operating means well known in the art, so as the hood would be folded by activating these means, rather than by manual action, but the result would be the same as that described.

In order to return the hood from a fully folded configuration (FIG. 2) to an extended configuration covering the driving compartment (FIG. 1), the user needs only reverse the cycle of operations just described.

Figure 8:
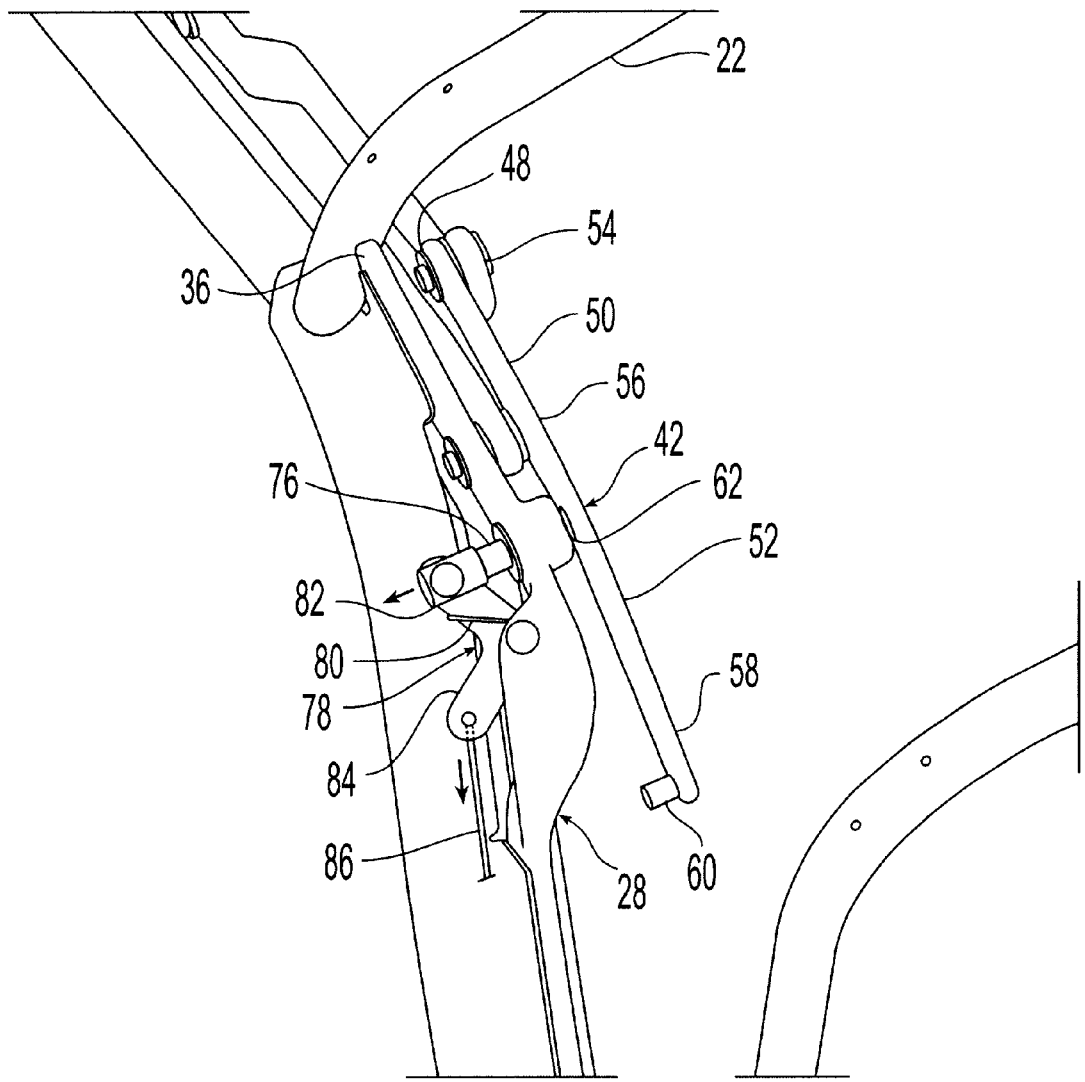
FIG. 8 is a perspective view of the detail of FIG. 6 in a different operating configuration.

On the other hand, to move the hood from its extended configuration (FIG. 1) to a partially folded position (FIG. 3), in addition to disengaging the catch mechanism 24 and pushing back the front portion of the frame 16, it is necessary to disengage the pins 76 from the holes 62. This is done by pulling on the cables 86, causing the levers to pivot anticlockwise (FIG. 8) and thereby withdraw the pins 76 from the holes 62.

In this way, the rigid connection between each auxiliary lever 42 and an associated arm 28 is broken, leaving them pivotally connected in such a way that the second linkages 20 arranged on either side of the frame 16 are disengaged from their respective first linkages 18. Pushing back the front portion of the frame 16 thus affects only the second linkages 20. These pivot relative to the first linkages 18, which remain fixed in position, thus folding only the front portion 12 of the flexible hood.

Figure 9:
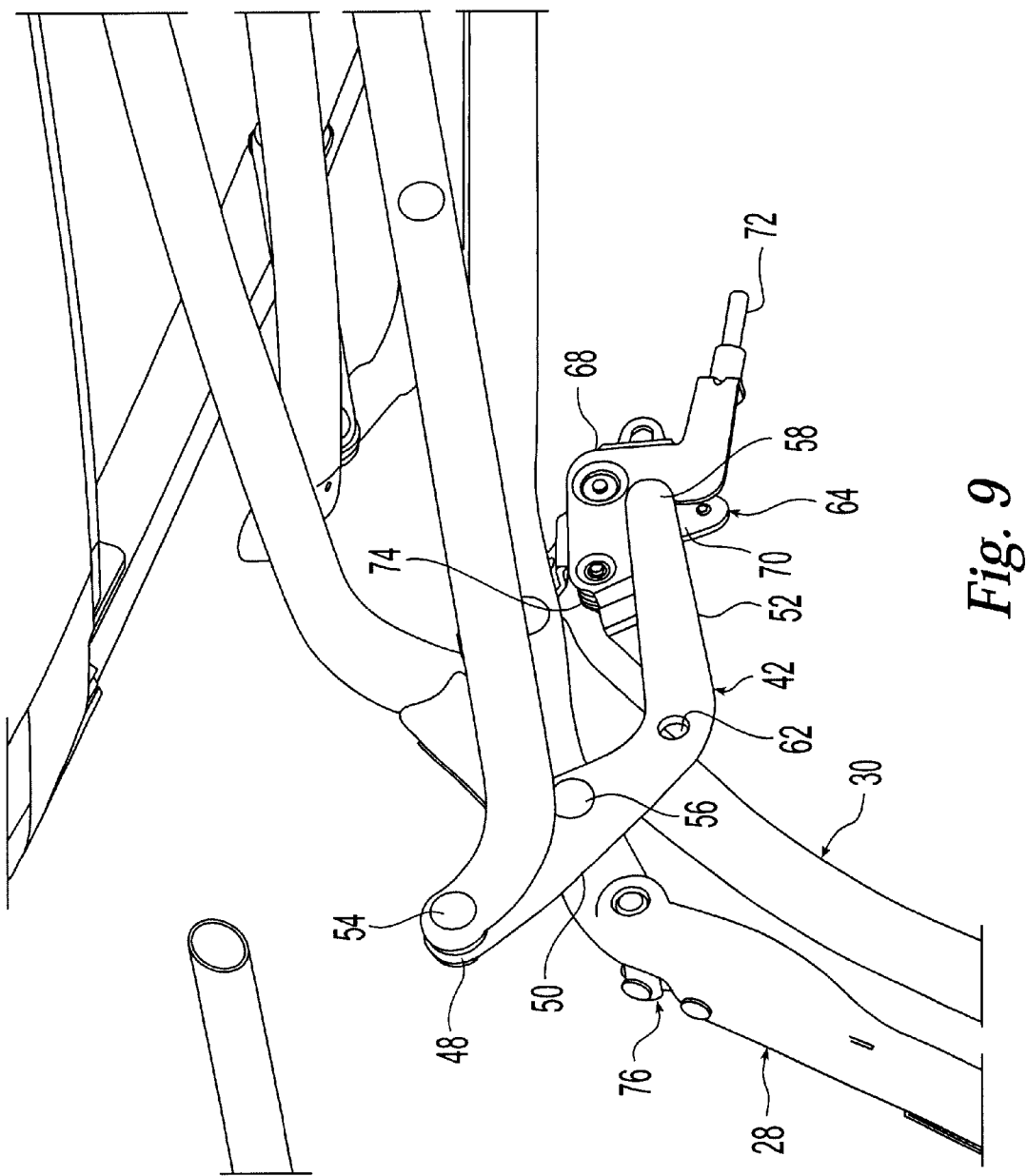
FIGS. 9 and 10 are perspective views of details of the device of the invention in the configuration of FIG. 3.
Figure 10:
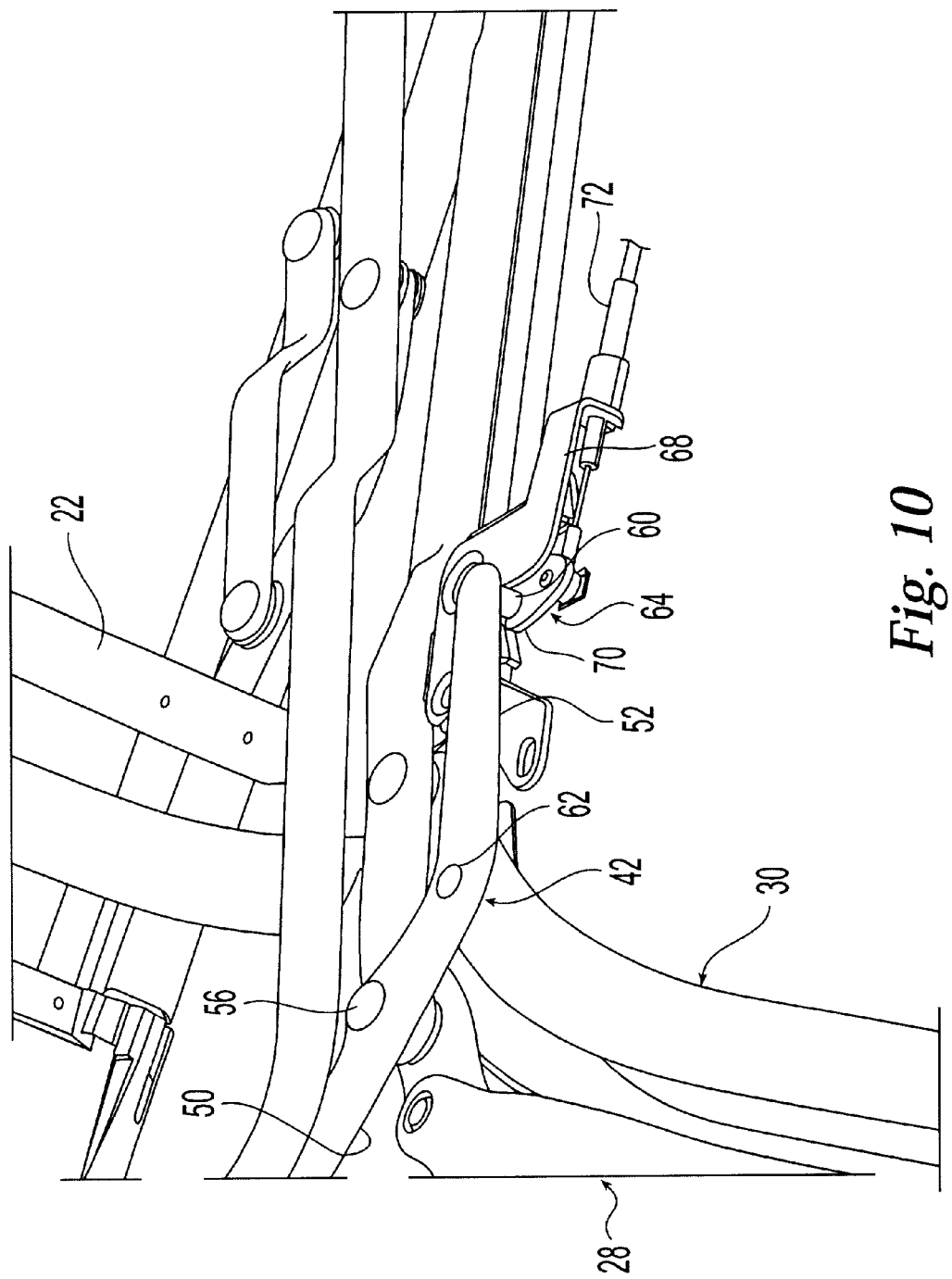

This configuration is held in place by the teeth 60 which, on the pivoting of the second linkages 20 (see FIGS. 9 and 10) each engage a respective hook-shaped end 70 of the catch members 64 of the locking devices.

In order to return the hood from a partially folded configuration (FIG. 3) to an extended configuration covering the driving compartment (FIG. 1), a user, first of all, acts on the cables 72 thereby pivoting the catch members 64 about their pivoted end 66 and disengaging the teeth 60 from the end 70. In this way, when pushed forwards, the second parallelogram linkages 20 are free to pivot in the opposite sense to that of the folding movement.

Naturally, the principle of the invention remaining unchanged, manufacturing details and embodiments may vary widely from those described purely by way of non-limitative example, without departing thereby from the scope of the invention.

What is claimed is:

1. A flexible hood for a convertible motor car which includes a cover with a front portion and a rear portion, and a frame for supporting the cover which includes side portions secured to the body of the car, extending along respective sides of the hood and each including a first and a second parallelogram linkage arranged in series and operable to enable the hood to be moved to an extended configuration covering the driving compartment and to a configuration fully folded behind this compartment, wherein each of the said second parallelogram linkages has means enabling it selectively to move independent of its associated first linkage, thereby allowing only the front portion of the flexible hood to be folded.

2. A hood according to claim 1, wherein each first parallelogram linkage includes substantially parallel first and second arms, each with a respective end pivotally connected to the car body and an opposite end pivotally connected to a first transverse rod, and in that each second parallelogram linkage includes the said first rod, an auxiliary lever, a third arm and a second rod, one end of the said third arm and the lever being pivotally connected to a respective end of the first rod, with the ends of the said second rod being pivotally connected to the third arm and an end of the auxiliary lever respectively, the said means being operable to enable the second linkage selectively to move independently of the first linkage by being able selectively to lock the auxiliary lever and the first arm in a rigid connection.

3. A hood according to claim 2, wherein the pivotal connection between the auxiliary lever and the first rod shares a common axis with the pivotal connection between the first arm and the first rod.

4. A hood according to claim 2, wherein the said means allowing the second linkage selectively to move independently of the first linkage includes a pin mounted on the first arm for sliding along a direction parallel to the axis of the pivotal connection and engageable in a hole in the auxiliary lever.

5. A hood according to claim 4, wherein a control lever and a biasing spring are associated with the pin to control the sliding thereof.

6. A hood according to claim 5, wherein the said control lever is formed by a first and a second wing in a substantially L-shaped arrangement, the distal end of the first wing being connected to the pin and the distal end of the second wing being connected to an actuator member, with the control lever pivoted on the first arm in the region connecting the wings.

7. A hood according to claim 4, wherein the said auxiliary lever is formed by a first wing and a second wing arranged at an angle to each other, with the pivotal connection to the first rod being located in the median portion of the first wing and the pivotal connection to the second rod being located in the distal portion of the first wing and a tooth extending transversely from the distal portion of the second wing for engaging with a respective locking device fixed to the car body, and a hole for engaging the pin being formed in the junction area of the two wings.

8. A hood according to claim 7, wherein the said locking device includes a catch member with one end pivoted to the body or on a fixed member secured thereto, and the opposite end shaped like a hook and controlled by an actuator member and a biasing spring.

* * * * *